United States Patent
Bliss et al.

(10) Patent No.: US 6,654,789 B1
(45) Date of Patent: Nov. 25, 2003

(54) SYSTEM FOR STORING AND RETRIEVING OLD AND NEW ELECTRONIC IDENTIFIERS

(75) Inventors: Austin C. Bliss, Somerville, MA (US); Robert W. Mack, Cambridge, MA (US); William B. Kaplan, Newton, MA (US); Mark Rosenstein, Cambridge, MA (US)

(73) Assignee: FreshAddress, Inc., Newton, MA (US)

( * ) Notice: Subject to any disclaimer, the term of this patent is extended or adjusted under 35 U.S.C. 154(b) by 0 days.

(21) Appl. No.: 10/030,849
(22) PCT Filed: Jul. 20, 2000
(86) PCT No.: PCT/US00/19801
§ 371 (c)(1),
(2), (4) Date: Jun. 20, 2002
(87) PCT Pub. No.: WO01/06497
PCT Pub. Date: Jan. 25, 2001

Related U.S. Application Data
(60) Provisional application No. 60/144,687, filed on Jul. 20, 1999.

(51) Int. Cl.[7] .............................................. G06F 15/16
(52) U.S. Cl. ....................... 709/206; 709/203; 709/219; 709/245
(58) Field of Search ................................. 709/200–203, 709/206–207, 217–219, 227–229, 245–246, 250

(56) References Cited

U.S. PATENT DOCUMENTS

| | | | | |
|---|---|---|---|---|
| 5,999,932 A | * | 12/1999 | Paul | 709/245 |
| 6,061,738 A | * | 5/2000 | Osaku et al. | 709/245 |
| 6,457,060 B1 | * | 9/2002 | Martin et al. | 709/245 |
| 6,505,236 B1 | * | 1/2003 | Pollack | 709/206 |
| 6,507,866 B1 | * | 1/2003 | Barchi | 709/207 |
| 6,574,658 B1 | * | 6/2003 | Gabber et al. | 709/206 |

* cited by examiner

*Primary Examiner*—Bharat Barot
(74) *Attorney, Agent, or Firm*—Wolf, Greenfield & Sacks, P.C.

(57) ABSTRACT

An accessible electronic system is provided for storing old and new electronic identifiers and for searching and matching the new and old electronic identifiers of an entity. The electronic system creates a bridge from the old to the new electronic identifiers. During a registration process a registrant may provide the system with a preferred electronic identifier in addition to a series of functional and/or non-functional electronic identifiers. During a searching process, if the searcher provides the system with any of the electronic identifiers provided to the system by the registrant, the system will return the preferred electronic identifier of the registrant.

20 Claims, 6 Drawing Sheets

SYSTEM FOR STORING AND RETRIEVING OLD AND NEW ELECTRONIC IDENTIFIERS

This application claims the benefit of Provisional Application Ser. No. 60/144,687 filed Jul. 20, 1999.

SUBJECT MATTER OF THE INVENTION

1. Field of the Invention

The present invention relates to a system for storing and retrieving electronic identifiers, and, more particularly, an interactive system for creating and maintaining a searchable database of old and new electronic identifiers, such as e-mail addresses.

2. Background of the Invention

Most Internet users have multiple e-mail addresses (e.g. austin@freshaddress.com). These electronic addresses are unique ways of reaching an individual, but are not necessarily permanent throughout one's life. Electronic addresses change for many reasons, including when the individual moves, changes employers, or selects a different Internet service provider. Instead of changing or letting an address lapse, some people will maintain multiple addresses. For example, someone may obtain an address through school, add a personal address, and obtain an address from work. Still others maintain multiple Internet service providers to mitigate access problems, and each ISP typically yields at least one e-mail address. The result is that a single individual or entity may accumulate many addresses over time.

When an individual changes his e-mail address, he must notify friends, relatives, and business associates of the new contact information. There are also numerous electronic services and businesses that need updating. Inevitably, not everyone is notified, and those who are not notified are left with an e-mail address that no longer functions or works—a "dead" address. When e-mail is sent to a dead address the sender typically receives a message informing them that the message was undeliverable, but not providing a current e-mail address for the intended recipient. Other old addresses may not be dead, but rather out of favor with its owner such that e-mail should not be sent to that address.

The same problems exist for other electronic based identifiers. For example, such identifiers can include homepages having URLs with a unique second level domain name or a common second level domain name shared by many other individuals and companies through a commercial service such as Geocities. Other identifiers may include chat handles or nicknames within certain Internet service providers such as AOL.

SUMMARY OF THE PRESENT INVENTION

It is an object of the present invention to provide an accessible electronic system for storing old and new electronic identifiers for searching and matching the new and old electronic identifiers of an entity.

It is a further object of the present invention to create a bridge from old to new e-mail addresses.

These and other objects of the present invention are accomplished by having a searchable electronic database of old and new electronic identifiers in which the information in the database is entered and maintained by individual registrants of the system. The searchable database stores both old and new information in association with one another.

These and other objects and features of the present invention will be better understood and appreciated from the following detailed description of one basic embodiment thereof, selected for the purpose of illustration and shown in the accompanying drawings, in which:

DETAILED DESCRIPTION OF THE INVENTION

Figure 2:
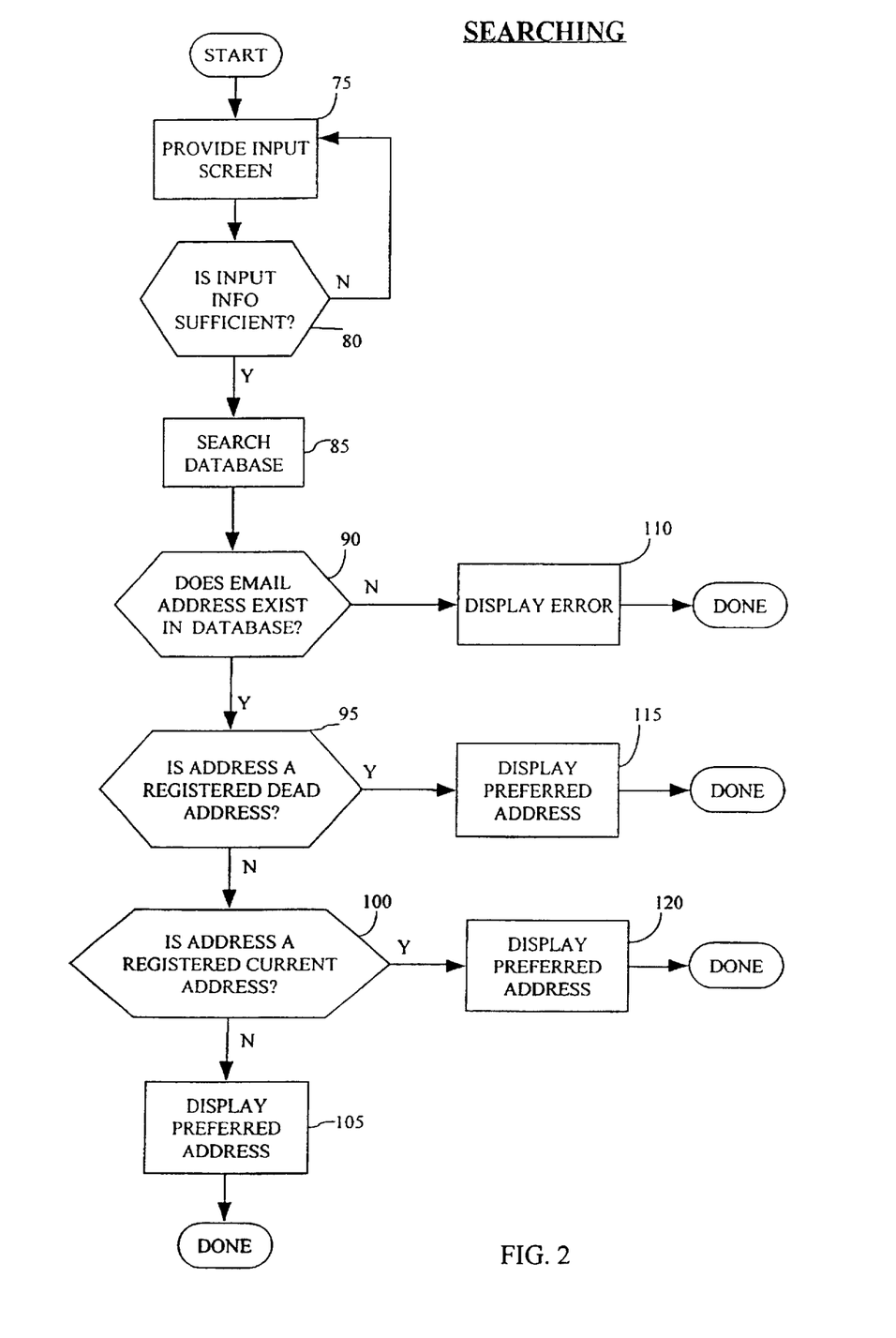
FIG. 2 is a flowchart diagram of the searching process of the present invention.
Figure 3:
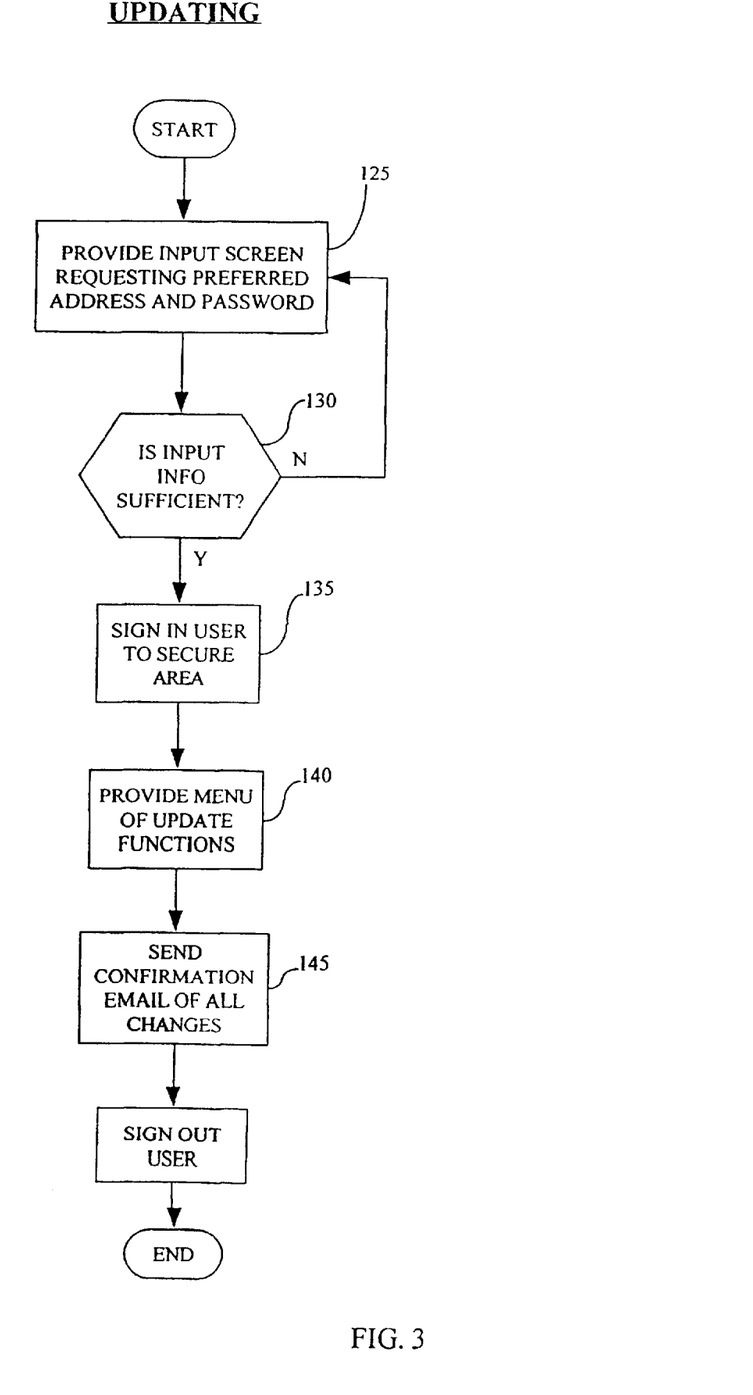
FIG. 3 is a flowchart diagram of the updating process of the present invention.

The present invention comprises a system which can be deployed as a web site on the Internet, having three primary components: registering (FIG. 1), searching (FIG. 2), and updating (FIG. 3). Through the use of the system, old and new electronic identifiers are interrelated so that a visitor to the system can find the preferred identiying information about a registrant with the system. While the embodiment described herein relates to e-mail addresses, the system could be readily adopted to accommodate other electronic identifiers, such as URLs, ICQ #s, and chat handles.

Registration Process

Figure 1:
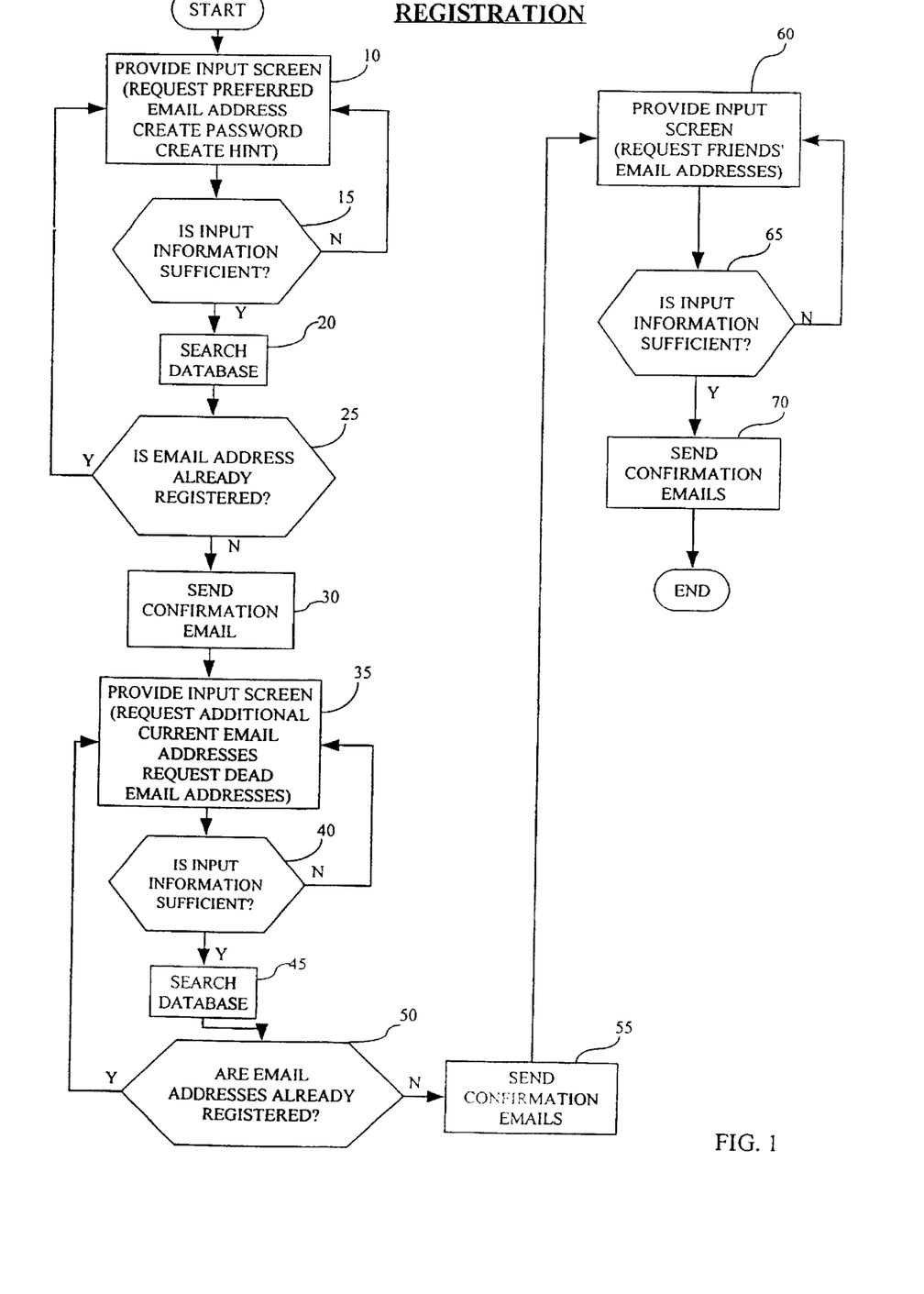
FIG. 1 is a flowchart diagram of the registration process of the present invention.

The registration component of the present invention is best illustrated in FIG. 1. In this process, the registrant enters his old and new e-mail addresses into the system. Variations of the precise process should be obvious to one of skill in the art, and those variations are included within the scope of this invention.

As a first step 10, the "soon to be" registrant must first enter his preferred address followed by a password. The preferred address may not be the only viable address for the registrant, but rather is the e-mail address he prefers others use to contact him. As a validity mechanism, the registrant must accurately retype the selected password. A password hint is also available in the preferred embodiment in case the registrant forgets his password in the future. Preferably, the system also checks to make sure that: the password is not contained within the preferred address; the hint does not contain the password; the password is not easy to guess; and the password contains a specified minimum number of characters. A typical interface is used such as a graphical button so that the registrant may indicate when he has finished entering the required information. Validation steps 15, 20, 25 are then performed to ensure among other things that: the preferred address conforms to the standard e-mail format 15; is unique 20 in comparison to other names in the system; and that the registrant has not already registered that e-mail address 25.

Additional features of the system provide for privacy options (not shown) which are intended to reduced unwanted e-mails, including spamming. For example. registrants would be given the option to have their preferred address returned to a visitor as a graphic. Or, similarly, the system would require answers to specific questions about the registrant which are not intended to trick the visitor, but rather to force the visitor to be responsive which is virtually impossible for a bot that may visit the system to update information about registrant, including an address database of spam or junk e-mail. Also, registrants would be given the option never to have their preferred address released without their explicit authorization. In this event, when a visitor searches for the registrant's preferred address, the system would notify the registrant requesting authorization to release his preferred address.

Additional privacy options would allow registrants to control which visitors the system provided with their preferred addresses. In one embodiment, the system would never return a registrant's preferred address to a list of specified visitors. Alternately, the system would only provide a registrant's preferred address to a list of specified visitors. To determine the contact information of the visitor, the system would require visitors to register before providing search results. Additionally, registrants would be able to specify different privacy options for each address entered during the registration process. Such privacy options would be made available to the visitor through typical graphical and textual interfaces.

Other options also provide that the registrant may include text or graphical messages in response to a visitor. Such messages may include additional information such as that the registrant will be moving on a particular date. The system may also be set up by the registrant to yield particular preferred addresses depending on the date of the search. These features can be combined to include multiple preferred addresses in a list with date and other information for visitors searching the system. These features will be discussed in reference to searching in conjunction with FIG. 2 below.

The next step 30 is an e-mail confirmation that is sent to the registrant using the preferred address. The confirmation e-mail is monitored for a return or bounce-back which would indicate an error with the preferred address. Moreover, the confirmation e-mail also allows the recipient, if not the same as the registrant, to protest the use of the e-mail address within the system. The e-mail confirmation system is more fully described below in conjunction with FIG. 4.

Once the preferred e-mail address has been validated, which may not include waiting for responses to the confirmation e-mail 30, the registrant is requested to enter one or more additional e-mail addresses 35. A typical graphical function is provided to allow each newly entered address to be marked as dead or current. Dead addresses are addresses which are non-functioning, and current addresses are functioning but are not preferred by the registrant to be used for e-mail by visitors to the system. Validation steps 40, 45, 50 are then performed to ensure that all e-mail addresses conform to the standard e-mail format and for other issues as described in conjunction with steps 15, 20, 25 above. After these steps, a confirmation e-mail 55 may be sent to each e-mail address, whether current or dead for the purposes noted above with regard to the confirmation e-mail 30 described in conjunction with the preferred address. This process will be discussed in more detail below.

Once the current and/or dead addresses have been validated, which may or may not include results from the confirmation e-mail step 55, the registrant is queried 60 for e-mail addresses of at least one entity to be contacted in the event that the registrant's entered information becomes outdated. The registrant may also be prompted to enter his own name so that the contact or contacts can receive a notification from the system. A simple validation step 65 is then performed to ensure that all entered contact e-mail addresses conform to the standard e-mail format. Preferably, confirmation e-mails are then sent to the enumerated contacts 70. Here too, the recipient, if so desired, may object to or otherwise modify the contact information received from the system.

Having finished the complete registration process, the registrant is notified that he is registered with a preferred address; that he will receive a confirmation e-mail with information about the registration; and that he should update his registration where necessary.

In another embodiment, the confirmation e-mail steps 30, 55, 70 may be launched near the completion of the registration process. Similarly, validation steps may occur at different times during the process. To maintain data quality, at least the preferred address is periodically sent e-mails by the system. In all cases, bounce-back or protest e-mail responses are monitored, so that the data can be handled as necessary. This is discussed further in conjunction with the periodic e-mail process described with FIG. 5 below.

In the event that one or more of the registrant's addresses are not unique in comparison to other names in the system, the registrant may be prompted to enter additional information to distinguish his address from another registrant's address, or the address may be blocked from registration.

In an additional embodiment, the described registration process will be operated in conjunction with the registration process of other services. For example, the system may coordinate with the signup process used when a customer contracts with a new Internet Service Provider, as that is a likely moment in which a new e-mail address is being issued.

Searching Process

The searching segment of the system provides a visitor the ability to obtain the preferred address of a registrant. While various embodiments are possible, FIG. 2 illustrates a preferred embodiment.

In the first step 75, the visitor is prompted to enter a target e-mail address to be searched. A graphical button is provided so that the visitor may indicate that they are ready for the search to be performed. Once started, a first validation step 80 is then conducted to ensure that the entered information conforms to the standard e-mail format.

The target e-mail address is then compared to all entries in the preferred address database 85. Since four possible search results are possible, three conditions are reviewed, although the order illustrated in FIG. 2 is not important: no match 90; match with a dead address 95; and match with a current address 100. If none of these conditions exist, the input address is the preferred address 105.

In the event of no match, the registrant is notified 110 that there is either a typographical error in the search query 75 or that there is no matching registration.

In the event of any match, whether dead 115, current 120, or preferred 105, the visitor is provided with the preferred address associated with the entered e-mail address, along with a graphical button that operates as the standard "mailto" function for commercial browsers such as those offered by Microsoft and Netscape. This step is delayed if the registrant has invoked privacy features such as requiring the visitor to answer a specific question before the preferred address is provided. Also, if textual or graphical messages have been entered into the system by the registrant, those features are also returned. Also, if the registrant has set up the system to return more than one preferred address, the visitor is provided the option of which address to use if the visitor is going to send an e-mail over the system. Finally, the system may indicate to the visitor the preferred address, the date of registration or last update by the registrant, or other information associated with the registration.

If the preferred address is known by the system to be suspect, such as through a bounce-back to a periodic e-mail, the visitor may also be warned that the preferred address may not be accurate or functioning. In the event that the visitor knows the preferred address to be suspect, such as through a previous bounce-back to an e-mail, a mechanism may be provided for the visitor to self-report the suspect preferred address. In one embodiment, a graphical button will be provided so that the visitor can indicate a suspect preferred address.

The searching of a particular record by a visitor may be stored as statistics for the registrant. The registrant may later visit the system and obtain the information which may include identification of the visitor and the date and time visited.

In the event that the system found no match to the search query, an option would be provided to notify the visitor once the preferred address was known. Such an option would be made available to the visitor through typical graphical and textual interfaces, and would require the visitor to enter appropriate contact information.

As a further feature, if the preferred address is not known by the system, a heuristic table is consulted. This table contains a list of unrecognized queries and the likely corrections. The table is generated by creating a list of common misspellings to commonly used domain names or changes to commonly used domain names. For example, if it is determined that a common misspelling of the domain name freshaddress.com is freshadress.com, then the table will refer to freshaddress.com for all appearances of freshadress.com. Similarly, if the provider of freshaddress.com changes all e-mail addresses to freshaddressinc.com, then the table would match those two addresses. If an entry is found in the table, the visitor is notified of his possible error and the suggested correction. The system may then prompt the visitor to perform a corrected query.

Updating Process

The updating process (FIG. 3) permits a registrant to change any part of his database information. To validate his identity, the registrant is first prompted 125 for his preferred address and password. If a registrant has forgotten his password, an e-mail containing his password is sent to his preferred address. Alternately, the password hint (entered during step 10) is provided, along with a link to customer service in the event that the registrant still cannot match the password.

After validation review of the address 130, and upon a successful match of the information, the registrant is passed through to a secure area of the system 135, where graphical buttons are provided 140 for the following functions: changing the registered preferred address, updating addresses, changing passwords, or updating contacts.

If the registrant wants to change the preferred address, a list of all e-mail addresses in the system for that registrant are presented for modification. In addition, preferably a blank text box is provided for a new address, although other variations of editing are available including having each address placed in a separate text box ready for modification. A graphical element is added to the side of the list that allows the exclusive selection of one of the existing addresses as the new preferred address. The registrant also has the option of entering a completely new preferred address. In such case, the former preferred address becomes a current or dead address pursuant to input from the registrant. A preferred address may only be altered after another address has been selected to replace it as the preferred address. In the event that there is a new preferred address, validation of the modified address for conformity to standard e-mail formatting and uniqueness is undertaken before the registrant's record is updated. When completed, confirmation e-mails 145 are sent in accordance with the procedure outlined above during the registration process.

To update other addresses, the registrant is also presented with a list of all of his registered e-mail addresses, and a graphical button to enter a new address. If the registrant clicks on any existing listed address, the registrant is provided with an "Update Address" text box, in which the address may be edited, and an exclusive list of three options is presented: "current," "dead," or "delete address." If the registrant clicks on the graphical button to enter a new address, the registrant is provided with a "New Address" text box for the registrant to enter the new address, and an exclusive list of two options is presented: "current" or "dead." The registrant is given the option to accept the changes. If accepted, the new or modified e-mail addresses are validated and confirmation e-mails are sent 145.

When updating the addresses, the registrant is also provided the option to add textual or graphical features for existing or new addresses. In addition, if the registrant desires, some of the privacy features may be implemented to preclude unwanted e-mail. When completed, the registrant also has the option to forward any new preferred address to all contacts or any other list of addresses, including from an address book that the registrant may have running in conjunction with the system.

To change passwords, the registrant is asked to enter his old password, his new password and a new password hint, and the registrant is asked to reenter his new password for confirmation. Processing modifications to these records are similar to step 10 described above.

To change contacts, the registrant is presented with his previously entered contact information including all existing contact e-mail addresses and a graphical button to add new contacts. As the registrant clicks on the item to be changed, text boxes or other known modification interfaces are made available. Upon acceptance by the registrant of the accuracy of the information entered, the information is validated, and confirmation e-mails 145 are sent as discussed above.

Confirmation E-mails

Figure 4:
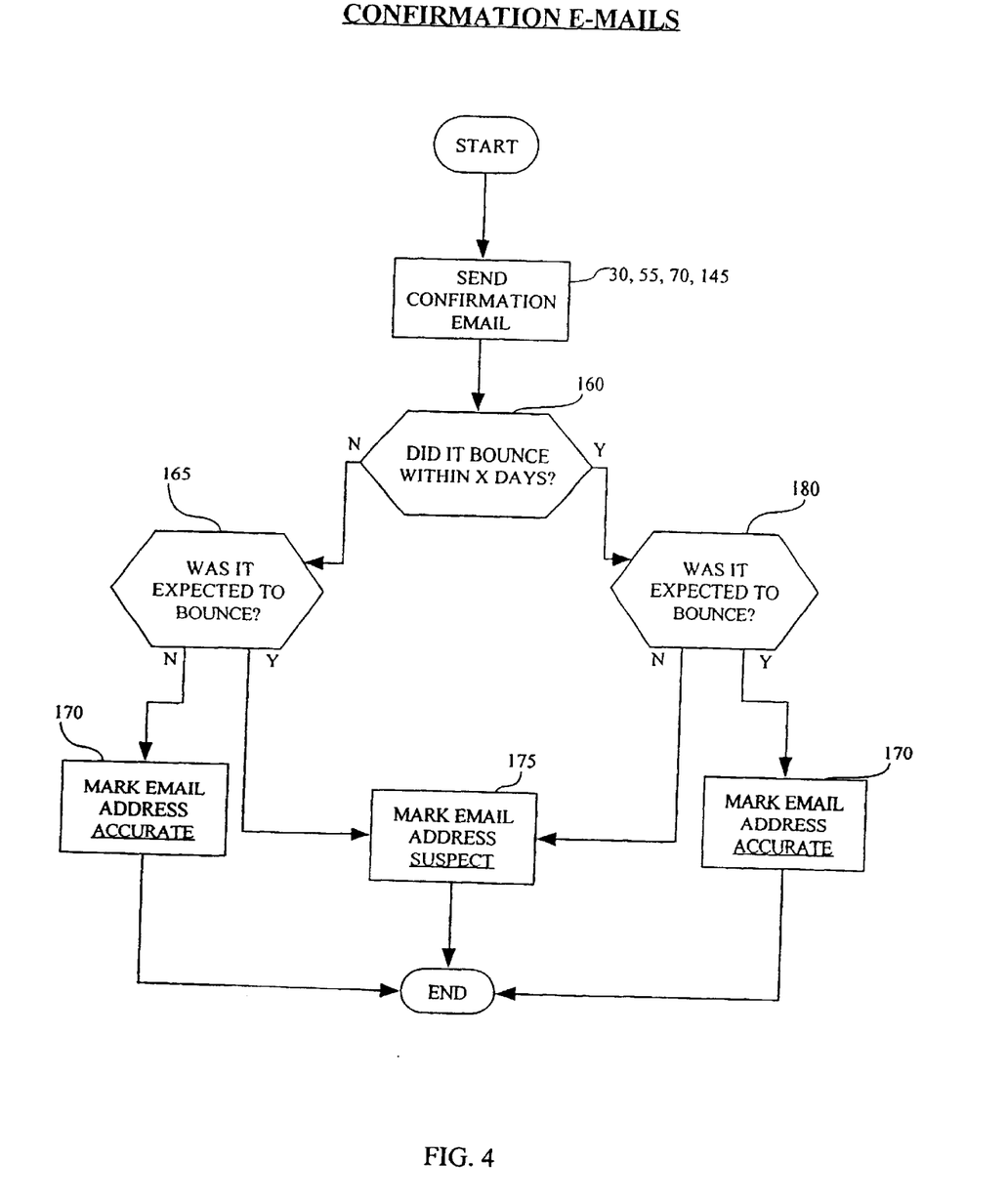
FIG. 4 is a flowchart diagram of the confirmation e-mail process of the present invention.

Confirmation e-mails, as illustrated in FIG. 4, are sent 30, 55, 70, 145 to every registered preferred, current, dead and contact address, as noted throughout this description, primarily as part of the registration process (FIG. 1) and the updating process (FIG. 3). Each mailing is tracked over a period of time, typically two days, to determine whether a bounce-back message is received 160 indicating that the confirmation was undeliverable. The system recognizes the difference between bounce-back messages and responses, including automatic replies. E-mails sent to current, preferred, and contact e-mail addresses are expected to arrive successfully. E-mails sent to dead addresses are expected to bounce-back. Thus, if an e-mail bounce-back to a preferred, current, or contact address is not received 165, the address is marked accurate 170. For a dead address with no bounce-back, the address is marked as suspect 175 and is subject to further processing such as notification to the registrant of a potential problem. Similarly, if an e-mail bounce-back to a dead address is received 180, then it is marked accurate 170. Since a server may be down or an e-mail may bounce-back for other reasons, addresses may be reconfirmed at a later date to give such computer problems time to clear.

Periodic e-mail

Figure 5:
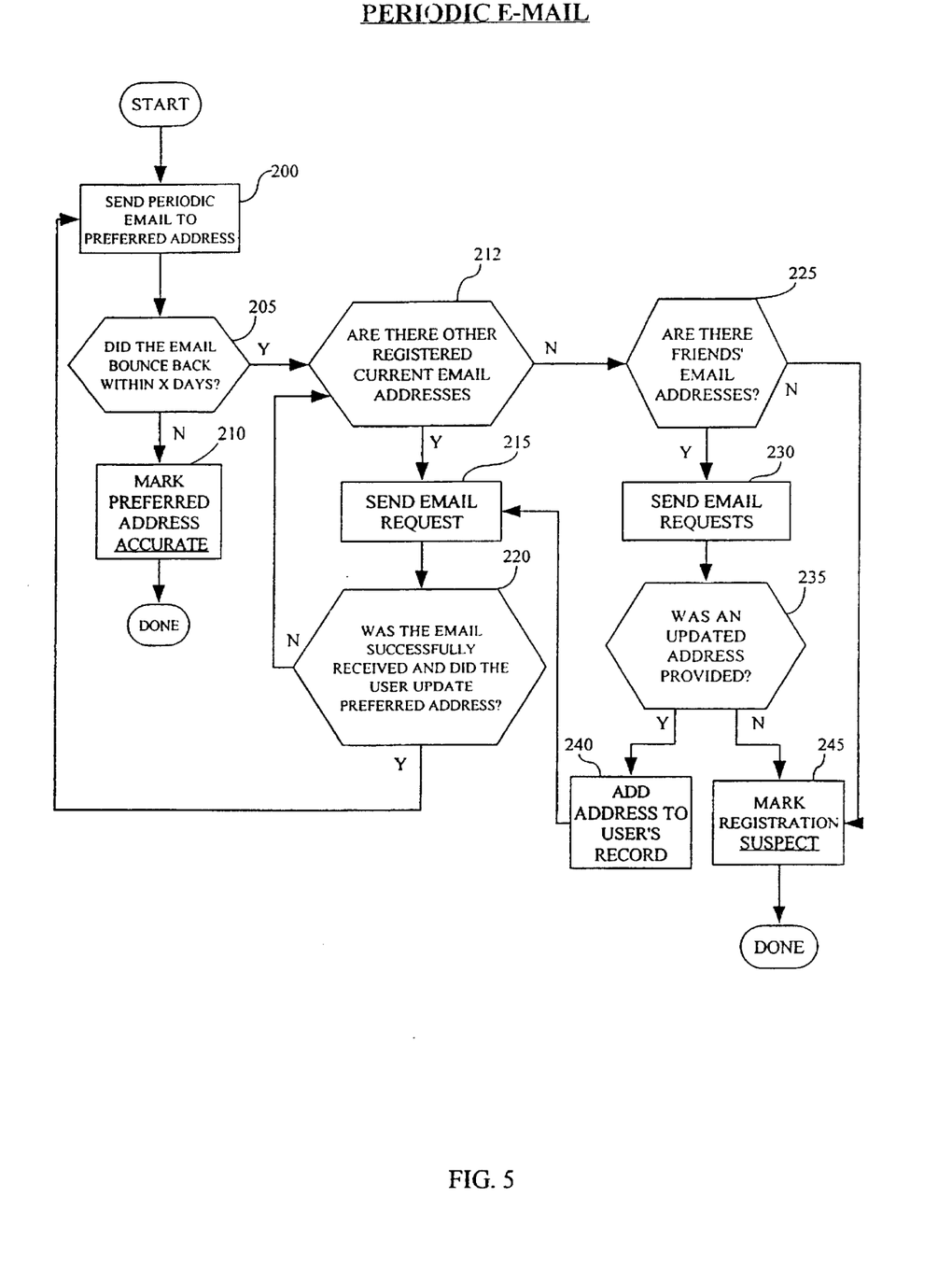
FIG. 5 is a flowchart diagram of the periodic e-mail process of the present invention.

A periodic e-mail is sent to every preferred address on a routine basis. The process is best illustrated in FIG. 5. It is also within the scope of this invention to send e-mails to all addresses provided by a registrant. However, maintaining the integrity of the system to a large extent relies on keeping the preferred address accurate.

Similar to the confirmation e-mail process described above, once a period of time has passed without a bounce-back message 205, the message is determined to have been successfully received and the preferred e-mail address marked "accurate" in the database 210. In the event that a bounce-back is received, the process is shifted to provide for sending e-mails to other current e-mail addresses of the registrant 212.

If one or more current e-mail addresses exist, then the system sends a request to the registrant at the first current address requesting that the registrant update his preferred address 215. If the registrant returns and updates his preferred address 220, the testing process will begin again at step 200. If, within a designated period of time, that message is bounced-back, that address is marked suspect, and the system sends an e-mail to the next listed current address, if any, in step 212. Step 212 is also repeated if the registrant fails to return to the site to update his preferred address within a reasonable period of time.

Once all current addresses have been used with no updating of the preferred address, the system searches for registered contact addresses 225. An e-mail to the contacts' e-mail addresses requests the e-mail address of the registrant 230. If a contact provides an e-mail address for the registrant 235, it is added to the database record 240 and step 215 is re-executed. If, within a designated period of time, no contacts provide an updated address. the registrant's information is marked "suspect 245".

Other Features

While it is not part of the system, the registrant or visitor may use the system in conjunction with an address book that is retained either on a common website or a local address book that can be purchased or created at other websites, an individual computer, or a network of computers. For example, the system may be used in conjunction with commercial e-mail systems such as those offered by Microsoft (Outlook) or web-based e-mail systems such as Hotmail. As such, when the registrant sends an e-mail, the system will be searched and the e-mail address for the recipient (if a registrant) will be confirmed or updated before the e-mail is sent.

Figure 6:
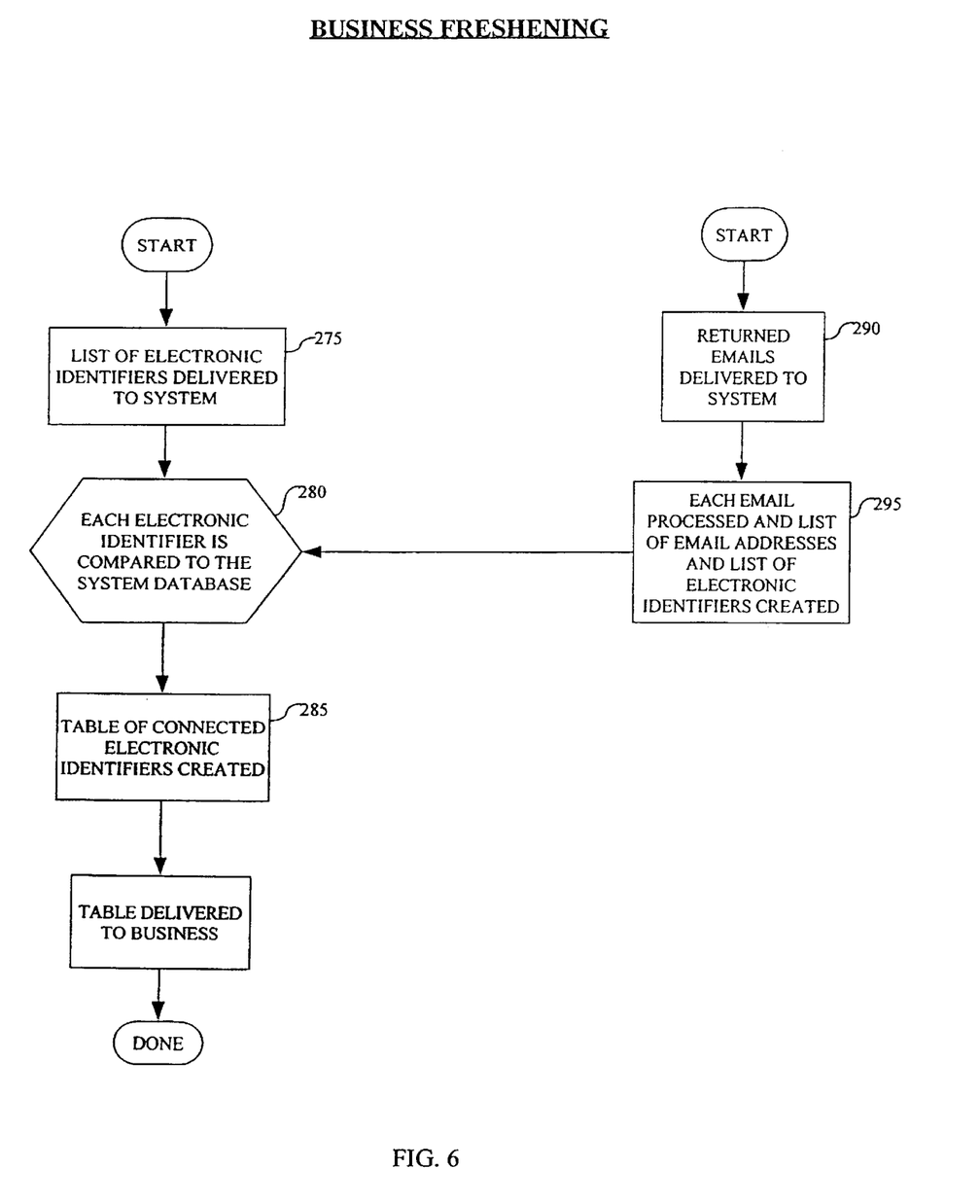
FIG. 6 is a flowchart diagram of the third-party database refreshing process of the present invention.

Similarly, as shown in FIG. 6, target e-mail lists or e-mail address books may be forwarded 275 to the system for review of each of the target e-mail addresses 280. The review is similar to that undertaken during the search process noted above. However, with larger databases that are being reviewed, the system will either correct the actual information in the delivered database or provide a table of the delivered addresses and the preferred address for those in the system 285. An alternative is to have a series of bounce-backs sent to the system 290. The system culls the bounce-backs 295 for each address used in the failed e-mail. These e-mail addresses become the targets for the searching process described above.

Additionally, a connection to the system may be provided in standard bounce-back e-mail messages so that the recipient of such a message can use the system to search for a preferred address. In a preferred embodiment, a link will be provided in the bounce-back message to a web site on the Internet where the recipient can use the system.

Having described this invention in detail, those skilled in the art will appreciate that numerous modifications may be made thereof without departing form the spirit of this invention. Therefore, it is not intended that the scope of this invention be limited to the embodiment illustrated and described. Rather, it is intended that the scope of this invention be determined by the appended claims and their equivalents.

What is claimed is:

1. A system for multiple electronic identifiers, comprising:
a registration process wherein at least one series of electronic identifiers is entered, said at least one series including at least two electronic identifiers, one of said at least two electronic identifiers being identified as a preferred electronic identifier; and
a searching process wherein a visitor enters a target electronic identifier;
wherein said target electronic identifier is compared to said at least one series of electronic identifiers, and if said target electronic identifier matches one of the electronic identifiers in said at least one series, said preferred electronic identifier is returned as a response to the visitor.

2. The system of claim 1, wherein said electronic identifier is an e-mail address.

3. The system of claim 1, wherein said preferred electronic identifier is returned in the form of a graphical image.

4. The system of claim 1, wherein said preferred electronic identifier is returned only upon the successful answering of a question by the visitor.

5. The system of claim 1, wherein said registration process includes at least one contact electronic identifier for each of said series of electronic identifiers, and said contact electronic identifier is utilized to update said preferred electronic identifier if said preferred electronic identifier is non-functioning.

6. The system of claim 5, wherein a desired list of electronic identifiers is notified of changes in said preferred electronic identifier.

7. The system of claim 1, further including a confirmation process wherein each of said electronic identifiers from said series of electronic identifiers is confirmed as accurate or suspect.

8. The system of claim 7, wherein said electronic identifiers are e-mail addresses, and said confirmation process comprises sending an confirmation e-mail to each of said functioning electronic identifiers from said series of electronic identifiers, monitoring said confirmation e-mail for bounce-back messages or no response, and marking said electronic identifiers as suspect if a bounce-back message is received or accurate if no response is received.

9. The system of claim 1, wherein said electronic identifier is an e-mail address, and a plurality of e-mail bounce-backs are individually culled by the system to create said target e-mail addresses for said searching process.

10. The system of claim 1, further including a heuristic table having a list of unrecognized electronic identifiers and likely corrections, and said electronic identifiers provided during said registration process and said searching process are compared to said table, and said likely corrections are returned as a response to the visitor.

11. The system of claim 1, wherein the at least one series of electronic identifiers includes at least one non-functioning identifier.

12. The system of claim 11, wherein the at least one non-functioning electronic identifier was previously a functioning electronic identifier.

13. The system of claim 1, wherein the at least one series of electronic identifiers includes at least one of a chat handle and a nickname.

14. The system of claim 1, wherein the at least one series of electronic identifiers includes a uniform resource locator.

15. The system of claim 1, wherein the preferred electronic identifier is a functioning electronic identifier.

16. A system for multiple e-mail addresses, comprising:

a registration process wherein at least one series of e-mail addresses is entered, the at least one series of e-mail addresses including at least one e-mail address, the at least one e-mail address from the at least one series being identified as a preferred e-mail address; and a searching process wherein a visitor enters a target e-mail address, wherein the target e-mail address is compared to the at least one series of e-mail addresses, and if the target e-mail address matches one of the e-mail addresses in the at least one series, the preferred e-mail address is returned as a response to the visitor.

17. The system of claim 16, wherein the at least one series further includes at least one of a functioning e-mail address and a non-functioning e-mail address.

18. The method of claim 17, wherein the series of electronic identifiers includes at least one of an e-mail address, a chat handle, and a nickname.

19. The method of claim 17, wherein the series of electronic identifiers includes at least one non-functioning electronic identifier.

20. A method comprising acts of:

receiving a series of electronic identifiers, the series including at least two electronic identifiers, one of the at least two electronic identifier being identified as a preferred electronic identifier;

receiving a request for a target electronic identifier; and comparing the target electronic identifier to the series of electronic identifiers and, if the target electronic identifier matches an electronic identifier in the series of electronic identifiers, returning the preferred electronic identifier in response to the request.

* * * * *